United States Patent
Kottapurath

(10) Patent No.: US 6,591,346 B1
(45) Date of Patent: Jul. 8, 2003

(54) MECHANISM FOR MANAGING AN OBJECT CACHE

(75) Inventor: Sherif Kottapurath, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 92 days.

(21) Appl. No.: 09/765,853

(22) Filed: Jan. 19, 2001

(51) Int. Cl.$^7$ .............................................. G06F 12/00
(52) U.S. Cl. ...................... 711/133; 711/135; 711/136; 711/159; 711/160; 707/2
(58) Field of Search ................................. 711/118, 133, 711/135, 136, 159, 160; 707/2

(56) References Cited

U.S. PATENT DOCUMENTS

| | | | | |
|---|---|---|---|---|
| 5,930,807 A | * | 7/1999 | Ebrahim et al. ............ 707/206 |
| 6,012,126 A | * | 1/2000 | Aggarwal et al. .......... 711/133 |
| 6,061,763 A | * | 5/2000 | Rubin et al. ................ 711/129 |
| 6,378,053 B1 | * | 4/2002 | Lamaire ...................... 711/159 |
| 6,385,699 B1 | * | 5/2002 | Bozman et al. ............. 711/133 |
| 6,438,575 B1 | * | 8/2002 | Khan et al. ................. 709/200 |
| 6,442,329 B1 | * | 8/2002 | Gough ........................ 386/125 |

* cited by examiner

Primary Examiner—Do Hyun Yoo
Assistant Examiner—Ngoc Dinh
(74) Attorney, Agent, or Firm—Hickman Palermo Truong & Becker LLP; Bobby K. Truong; Christian A. Nicholes

(57) ABSTRACT

An improved mechanism for managing an object cache is disclosed. An object cache manager receives a request for an object resident in an object cache. A determination is made as to whether the requested object is currently within a particular portion of the object cache. If the requested object is within this particular portion, then the object cache manager keeps the requested object within this portion of the cache by maintaining the requested object at its current position relative to other objects in the object cache. By removing the overhead of repositioning objects within a particular portion of the object cache, the efficiency of object cache management is significantly improved.

48 Claims, 12 Drawing Sheets

REFERENCING AN OBJECT TYPE 1

REFERENCING AN OBJECT TYPE 2

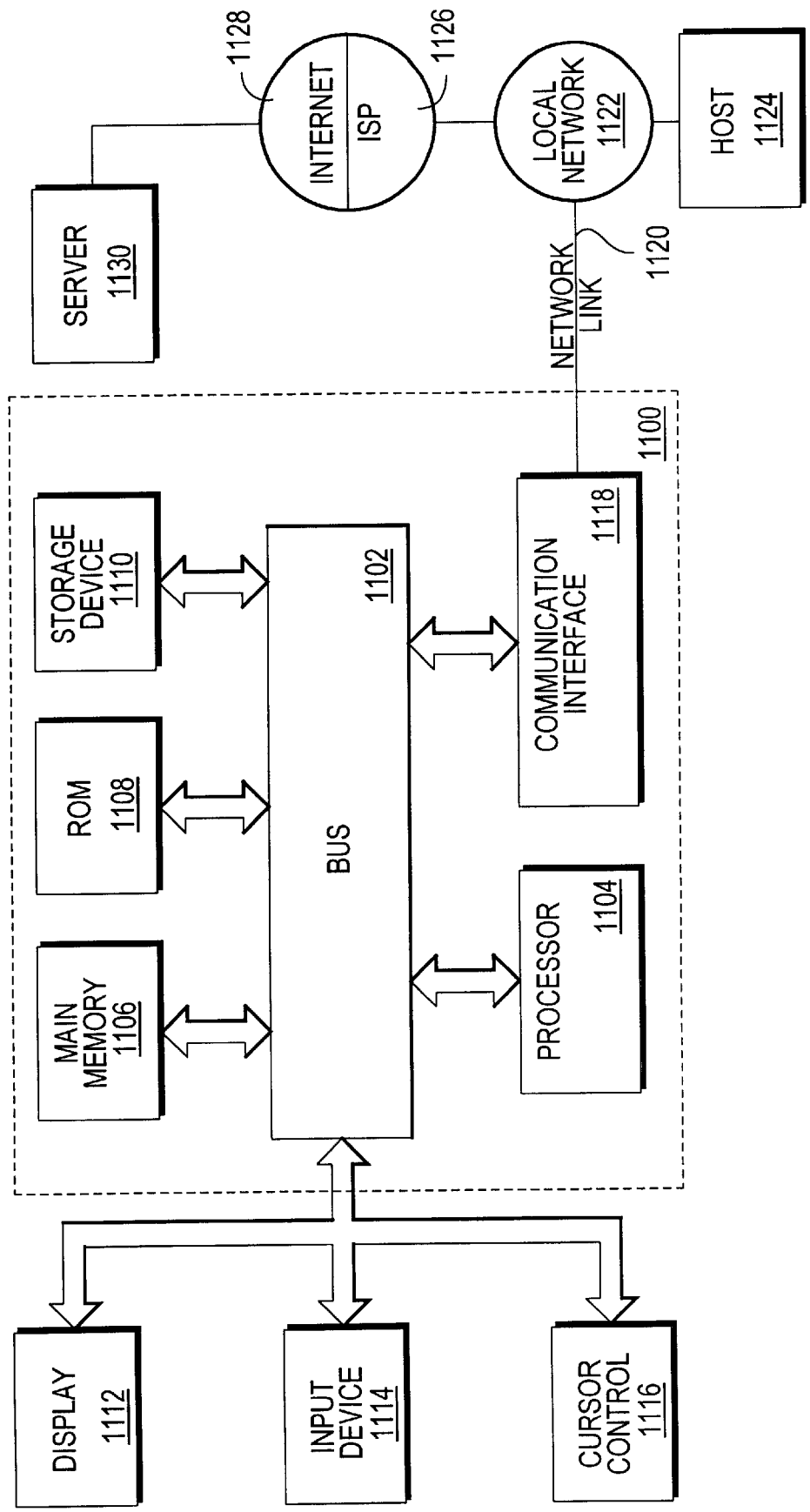

MECHANISM FOR MANAGING AN OBJECT CACHE

FIELD OF THE INVENTION

This invention relates generally to computer software, and more particularly to a mechanism for managing an object cache.

BACKGROUND OF THE INVENTION

The use of hardware caches to provide a fast storage buffer in the central processing unit of a computer to reduce the penalty of access to frequently requested resources is widespread and well understood. Likewise, in software, there is a need to retrieve information, in particular objects, in a timely and efficient manner. An object is a discrete item that can be selected and manipulated, often a self-contained item that contains data and the procedures necessary to manipulate that data. Object caches are used to store a set of frequently accessed objects so that they may be made available faster than if the objects were stored on disc or generated upon request through computation.

An object cache manager receives and services requests for objects from software applications. An object cache manager makes a determination on whether the requested object is stored within the object cache. If so, the object is retrieved from the object cache. If not, the requested object is created or retrieved from disc. In either case, the requested object is then delivered to the requesting party.

Object caches are typically implemented through the use of a doubly linked list. A linked list is a data structure in which each object contains a pointer to the next object, thus forming a linear list. A doubly linked list contains pointers to both the next and previous objects. As shown in FIG. 1, the first object in the list is called the "Head", and the last object in the list is called the "Tail." One can appreciate the "Head" and "Tail" of a doubly linked list are relative terms, but for ease of discussion it will be assumed that the "Head" is the portion of the doubly linked list from which objects are removed, and the "Tail" is the portion of the doubly linked list to which objects are added.

An object cache typically can only accommodate a bounded number of objects. Items are added to the doubly linked list until the limit of the number of objects the object cache may accommodate is reached.

When a new object is to be inserted into an object cache that is already at maximum capacity, an object must be deleted from the object cache before the new object can be added. Typically, the aim is to remove the least needed object in the object cache to maximize the benefit of storing objects in the object cache. It is often assumed that the least needed object is the least recently used object. For this reason, the doubly linked list used to implement the object cache is typically referred to as the "Least Recently Used List" or the LRU list.

FIGS. 1A, 1B, and 2 will now be referenced to illustrate the operation of referencing an object, and specifically the overhead involved, in the prior art. Assume FIGS. 1A, 1B and 2 show an object cache 100 that at most can accommodate 4 objects, and further assume that objects A, B, C, and D were inserted into the object cache in that order. FIG. 1A illustrates the state of the object cache immediately after inserting objects A, B, C, and D. Notice that the most recently added object "D", is near the Tail, and the least recently added object "A" is near the Head.

Upon receiving a request for a particular object in the object cache, the object cache manager removes a requested object off the LRU list. When the requesting party no longer needs that object, the object cache manager adds the object back to the LRU list. For example, assume that the object cache manager for the object cache shown in FIG. 1A receives a request for object C. In response to this request, object C is removed from the LRU list to indicate that it is currently in use, as shown in FIG. 1B. Then, when the object C is no longer in use, or is considered "freed", it is inserted back into the LRU list at the tail, as shown in FIG. 2. This process of removing the object from and inserting the object back into the LRU list involves the updating of five objects.

This is shown in greater detail in FIG. 3. More specifically, when object C is removed from the LRU list, object B is updated (302) to cause its downward pointer (FIG. 1B) to point to object D rather than object C. Similarly, object D is updated (304) to cause its upward pointer to point to object B rather than object C. When object C is added back to the LRU list, three objects are updated. Namely, object C is updated (306) to cause its upward pointer (FIG. 2) to point to object D, and its downward pointer to point to the tail. Object D is updated (308) to cause its downward pointer to point to object C rather than the tail. Finally, the tail is updated (310) to cause its upward pointer to point to object C rather than object D. As this discussion shows, whenever there is a "hit" in the object cache 100, five objects in the object cache 100 are updated.

It can be appreciated that the extra overhead involved in updating five objects every time an object is referenced in an object cache can be significant. In fact, it can become so significant that it degrades system performance. Since performance degradation is clearly an undesirable result, it is desirable to minimize this overhead as much as possible. Currently, however, there is no effective mechanism for doing so.

SUMMARY OF THE INVENTION

To overcome the shortcomings of the prior art, the present invention provides an improved mechanism for managing an object cache. According to one embodiment, when an object cache manager receives a request for an object resident in an object cache, a determination is made as to whether the requested object is currently within a particular portion of the object cache. In one embodiment, this particular portion is a portion containing some of the most recently used objects. If the requested object is within this particular portion, then the object cache manager keeps the requested object within this portion of the cache. In one embodiment, this is done by maintaining the requested object at its current position relative to other objects in the object cache. In other words, the requested object is not moved.

By not moving the requested object, the present invention eliminates the need to update a plurality of objects each time a cache "hit" occurs. This is turn significantly reduces the overhead incurred for objects that are repeatedly "hit". By removing unnecessary overhead, the present invention significantly increases the efficiency of the object cache. Hence, the present invention represents a significant improvement over the prior art.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11 is a block diagram that illustrates a computer system upon which an embodiment of the invention may be implemented.

DETAILED DESCRIPTION OF EMBODIMENT(S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions shall be discussed under topic headings that appear in the following order:

I. FUNCTIONAL OVERVIEW
II. INSERTING AN OBJECT
III. REFERENCING AND FREEING AN OBJECT
IV. DESTROYING AN OBJECT
V. HARDWARE OVERVIEW

I. FUNCTIONAL OVERVIEW

It is observed that the aforementioned cumbersome overhead involved in object cache maintenance in the prior art occurs when most objects are removed from the LRU list before the objects are in danger of expiring. In fact, it is further observed that the most frequently accessed objects in an object cache typically reside in the most recently used portion of the object cache. As shall be described in great detail, the present invention empowers these observations by providing a mechanism for identifying a portion of the cache and reducing the overhead of updating objects in that portion.

Figure 1A:
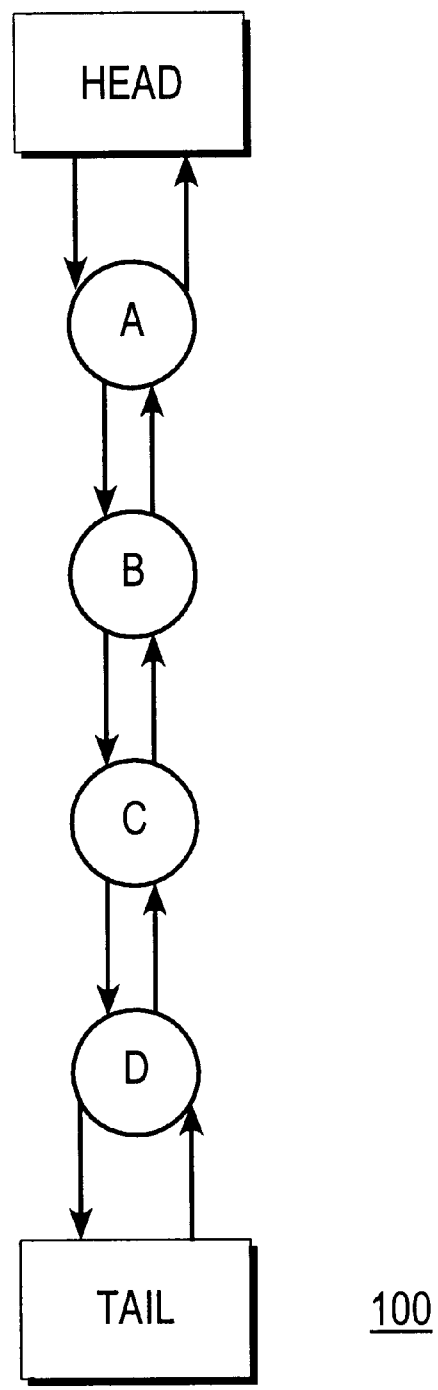
FIG. 1A is a pictorial representation of a first state of an object cache according to the prior art.
Figure 1B:
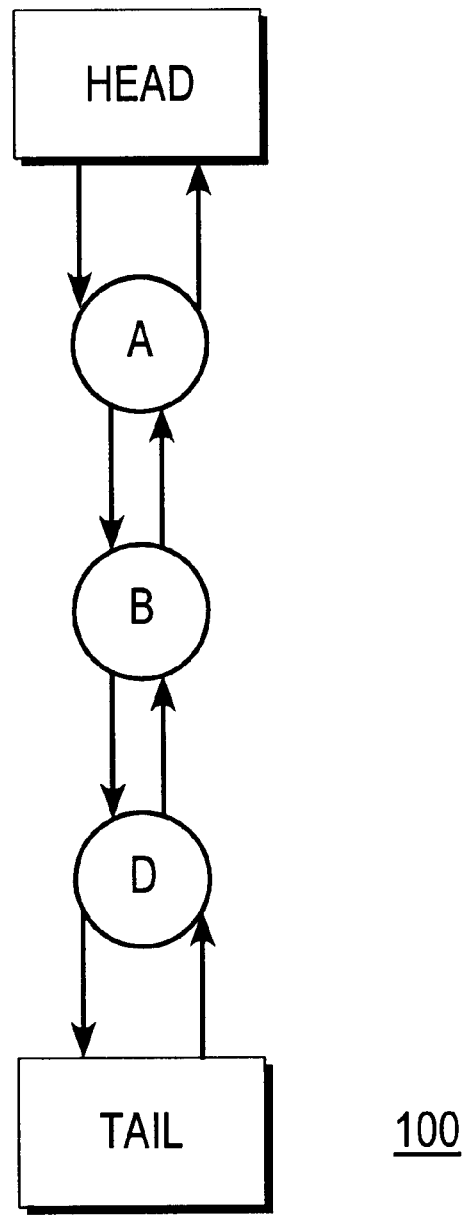
FIG. 1B is a pictorial representation of a second state of an object cache according to the prior art.
Figure 2:
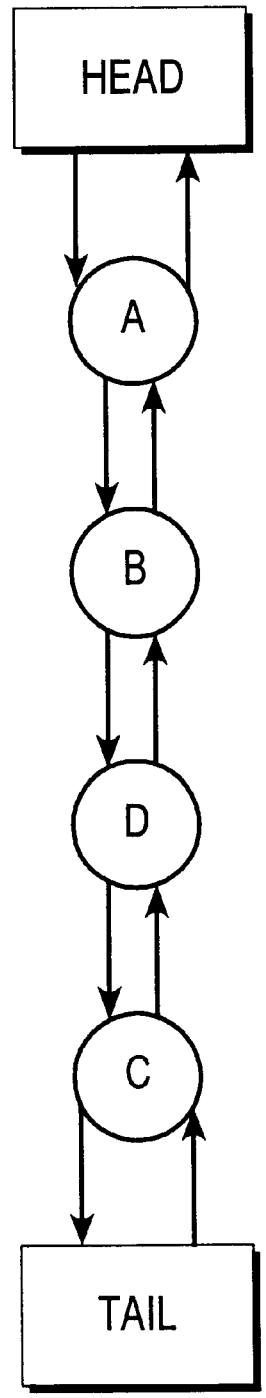
FIG. 2 is a pictorial representation of a third state of an object cache according to the prior art.
Figure 3:
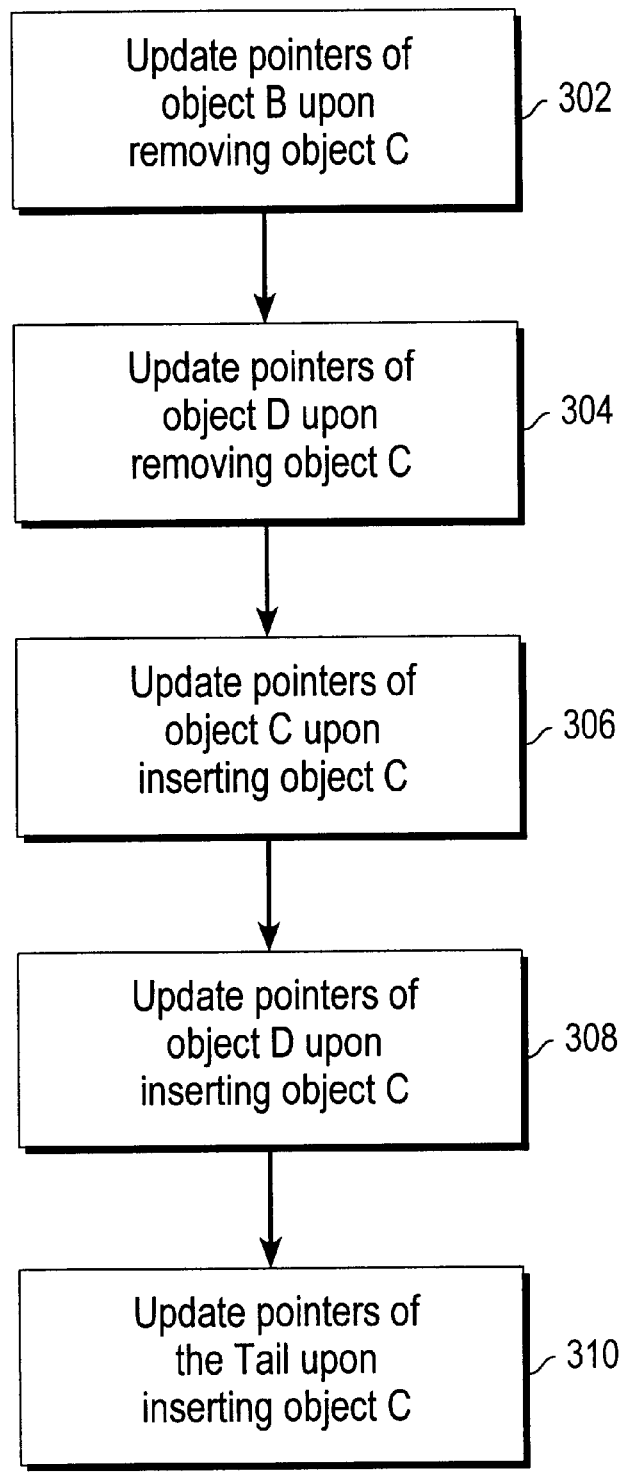
FIG. 3 is a functional block diagram illustrating the steps of updating an object cache in the prior art.
Figure 4:
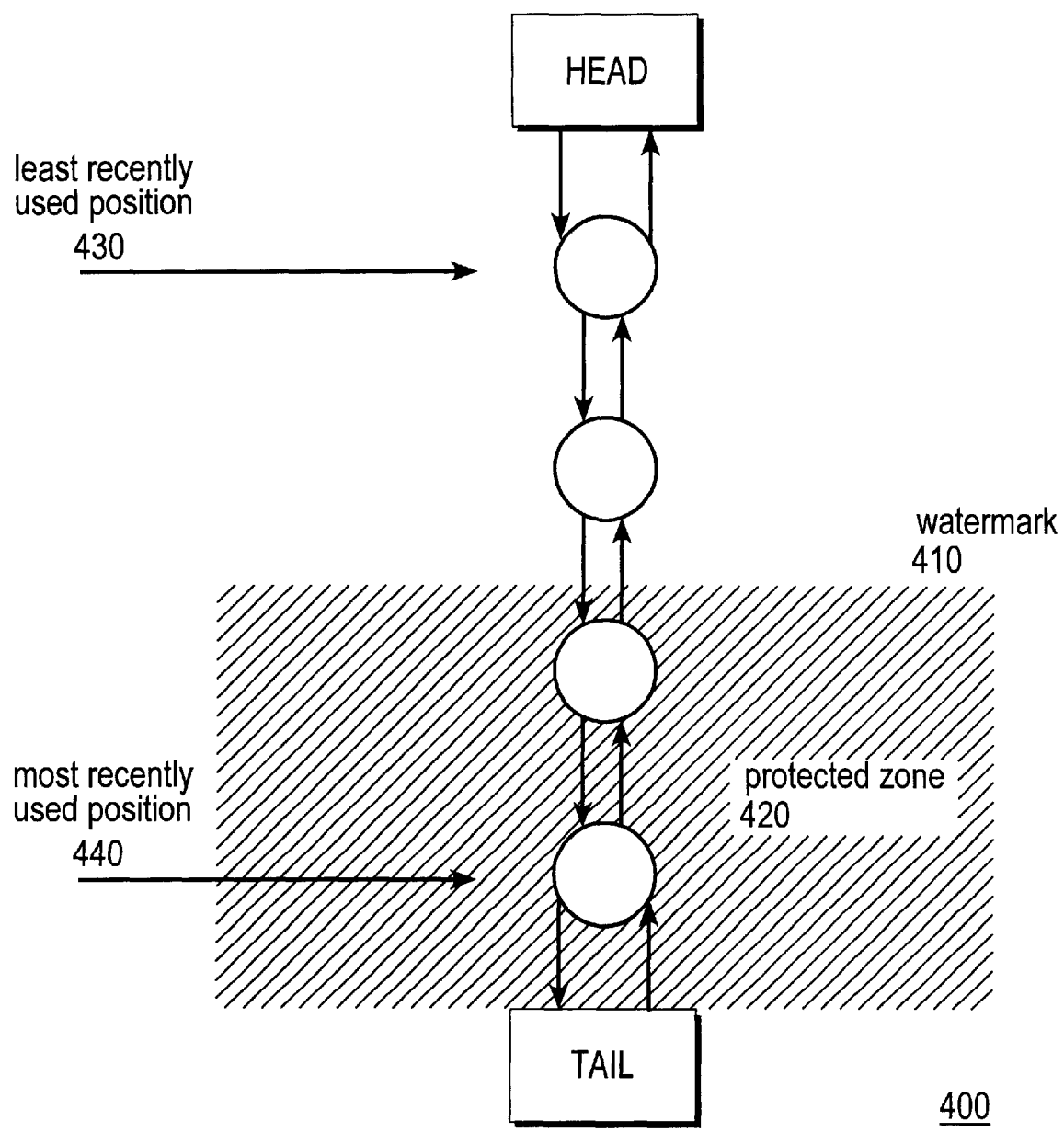
FIG. 4 is a pictorial representation of an object cache in accordance with one embodiment of the present invention.

FIG. 4 shows a pictorial representation of an object cache 400 of the present invention. The object cache 400 is implemented using a LRU list. In addition to containing well known elements such as a Head, Tail, and objects, the object cache 400 also contains the new elements of a watermark 410, a protected zone 420, a least recently used position 430, and a most recently used position 440, which will be described below.

A watermark 410 is a mechanism used in determining a boundary for a particular portion of the object cache corresponding to a most recently accessed area. A watermark 410 is intended to represent a broad range of means to identify areas of the object cache. For ease of explanation, the watermark 410 will be explained in terms of a percentage of the maximum allowed population of the cache. In one embodiment of the present invention, the watermark is set to 25%–50% of the maximum allowed population.

Any object residing in the object cache that has been used prior relative to the watermark 410 is said to be in the protected zone 420. Thus, new objects inserted to the object cache will reside in the protected zone 420. As previously explained, as time passes and objects age relative to other objects in the cache, objects migrate towards the Head of the list. Thus, as objects migrate towards the Head of the LRU list they may leave the protected zone 420.

The least recently used position 430 is the position of an object in an object cache that is the least recently used in that object cache, and thus, contains the object next to be replaced. A most recently used position 440 is the position of an object in an object cache that is the most recently used in that object cache, and thus, contains the object that was last added or referenced. Thus, the least recently used position 430 is at the opposite end of a LRU list from the most recently used position 440, and the most recently used position 440 resides in the protected zone 420.

In one embodiment, each object in the object cache has, in addition to any data and procedures, a flag and a rank. A flag is a mechanism for determining if a particular object is currently is use. The flag may indicate only one of two possible states; the flag may indicate either the object is in use or the object is not in use. In the protected zone 420, the use of the flag replaces the prior art practice of removing an object from the LRU list when an object becomes in use. When an object becomes referenced, instead of removing the object off the LRU list, the flag is set to indicate the object is in use. Likewise, when an object becomes unreferenced, the flag is set to indicate the object is not in use, instead of inserting the object back onto the LRU list. As will be explained in further detail below, at times it may be necessary to move an object in the object cache 400 to the most recently used position 440 when the flag state is changed to ensure the integrity of the object cache 400.

A rank is an integer value used in determining how recently used a particular object is relative to other objects in the object cache 400. Thus, while in the object cache 400, the rank of a particular object may change. The object cache manager sets an initial value for rank, which is assigned to the rank of the first object added. As will be explained in further detail below, when an object in the object cache 400 is inserted or referenced, the rank of that object may be updated. A summit rank is maintained by the object cache manager and has a value equal to the highest rank of any object in the object cache.

An object may be determined to reside in the protected zone 420 according to the following equation:

$$\text{Summit Rank} - \text{Rank} < \text{Object Cache Population Limit} * \text{Watermark}$$

The above equation assumes the watermark is expressed as a percentage. If the above equation is true, then the object resides in the protected zone 420. Otherwise, the object resides outside of the protected zone 420. This determination is important as it allows the object cache manager to defer the overhead involved in updating the positions of objects in the object cache 400 when objects are referenced inside the protected zone 420.

Having thus described the new concepts of the present invention, discussion will follow on how to apply these concepts to the functional operation of an object cache 400.

II. INSERTING AN OBJECT

Figure 5:
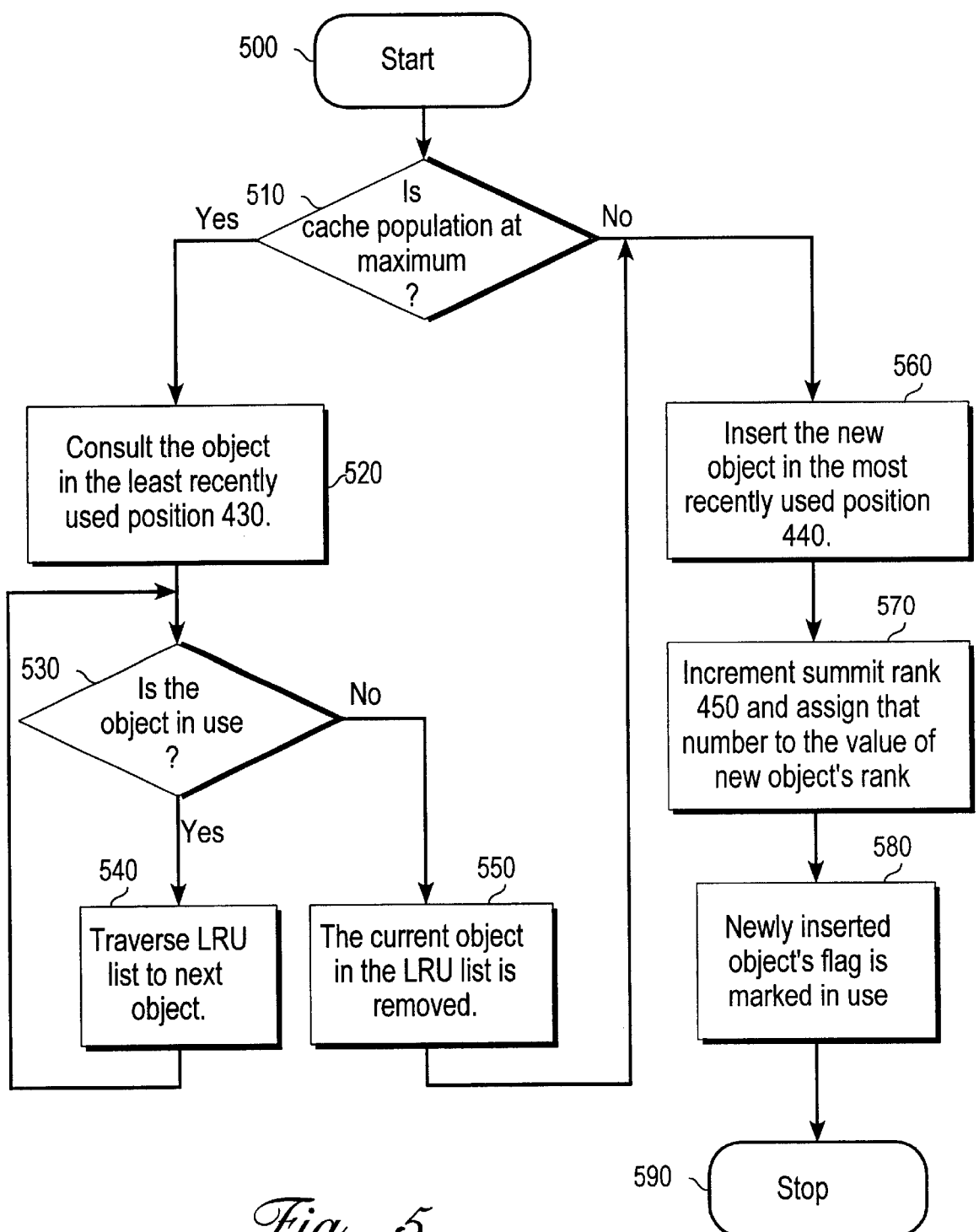
FIG. 5 is a flow diagram illustrating the operation of inserting an object according to one embodiment of the invention.

The process of inserting an object into the object cache 400 will now be explained with reference to FIG. 5. When inserting a new object into the object cache 400, the object cache manager determines (510) if the object cache has reached the object population limit. If the object population limit has not been reached, the object cache manager inserts (560) the new object, which will be elaborated on below. If the object population limit has been reached, it will be necessary to make room in the object cache 400 to accommodate the new object.

Upon determining that the object population limit has been reached, the object cache manager consults (520) the object in the least recently used position 430. The object cache manager determines (530) if that object is currently in use. If the object cache manager determines the object is not currently in use, then the object cache manager removes (550) the object that it has consulted. If the object cache manager determines that the object is currently in use, however, then the object cache manager traverses (540) the LRU list to the next object, and determines (530) if that object is in use. The object cache manager will thus traverse the LRU list until an object is determined to not be in use, and remove that object (550). Thus, by removing an object, the population of the object cache 400 has now been decremented by one and the object cache 400 can accommodate a new object.

After the object cache manager determines either that the object population limit has not been reached or has removed an unused object, the object cache manager inserts (560) the new object to the most recently used position 440. The object cache manager increments (570) the summit rank by one and the new summit rank value is assigned to the value of the newly inserted object's rank. The object cache manager then sets (580) the flag on the newly inserted object to indicate that the object is in use.

III. REFERENCING AND FREEING AN OBJECT

The practice of referencing and freeing an object in the present invention will now be described. In one embodiment of the present invention, herein entitled Type 1, the object cache manager updates the rank at the time of reference. This embodiment reduces the possibility of finding an object in use outside of the protected zone 420 by moving it to most recently used position 440 upon reference. A Type 1 embodiment has the drawback of penalizing objects that are in use for a long time. In another embodiment of the present invention, herein entitled Type 2, the object cache manager updates rank when objects are freed. This embodiment has the drawback of increasing the possibility of finding an object in use outside of the protected zone 420 by not moving the object upon reference. However, a Type 2 reference reduces the number of times a frequently accessed object would have to be repositioned to the most recently used position 440. The process of inserting an object and destroying an object is the same for both a Type 1 and Type 2 embodiments.

Figure 6:
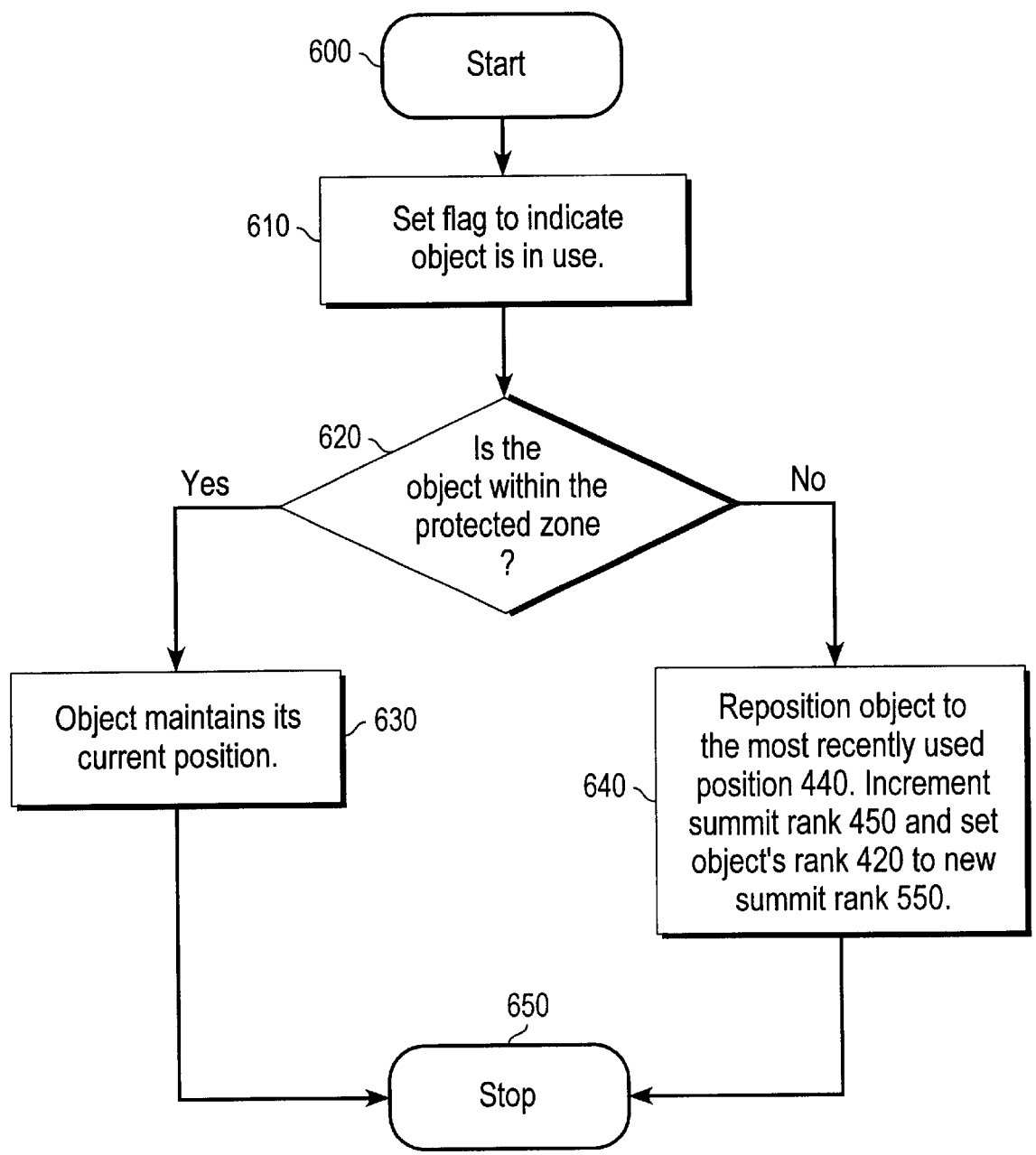
FIG. 6 is a flow diagram illustrating the operation of referencing an object according to one embodiment of the invention.

A Type 1 reference will now be explained with reference to FIG. 6. The object cache manager sets (610) the flag of the referenced object to indicate that the referenced object is in use. The object cache manager next determines (620) if the referenced objects resides within the protected zone 420. The object cache manager makes this determination by examining the summit rank, rank of the object, object cache population limit, and watermark as previously discussed. If the referenced object does reside in the protected zone 420, then the object cache manager maintains (630) the referenced object current position in the object cache. In other words, the object is not moved. Conversely, if the referenced object does not reside in the protected zone 420, then the object cache manager repositions (640) the referenced object into the most recently used position 440. The object cache manager increments the summit rank and sets the rank of the referenced object to this new value.

Figure 8:
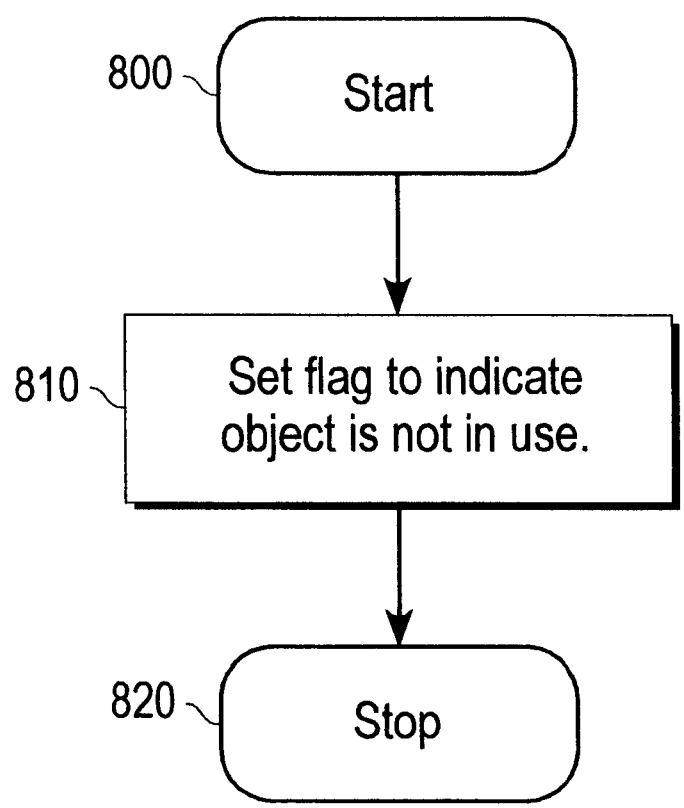
FIG. 8 is a flow diagram illustrating the operation of freeing an object according to one embodiment of the invention.

Freeing an object in a Type 1 embodiment of the present invention will now be described with reference to FIG. 8. An object is freed in this embodiment as the object cache manager resets (810) the object flag to indicate the object is not in use. As objects are moved (if at all) during the reference phase, no further action by the object cache manager is required.

Figure 7:
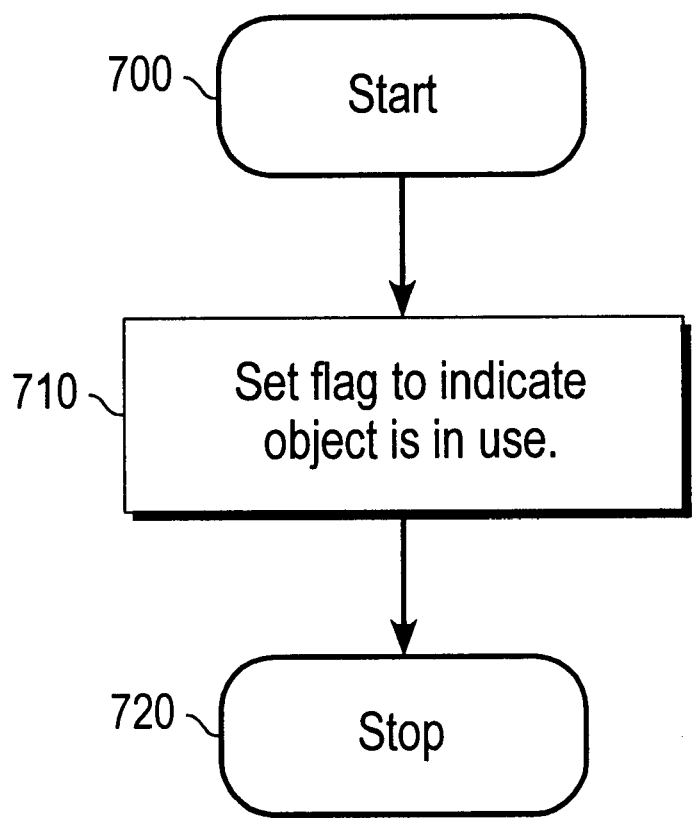
FIG. 7 is a flow diagram illustrating the operation of referencing an object according to another embodiment of the invention.

The act of referencing an object according to another embodiment of the invention, Type 2, will now be explained with reference to FIG. 7. The object cache manager sets (710) the flag of the referenced object to indicate that the referenced object is in use. As the object cache manager updates rank when objects are freed in a Type 2 embodiment, no further action by the object cache manager is required when referencing an object.

Figure 9:
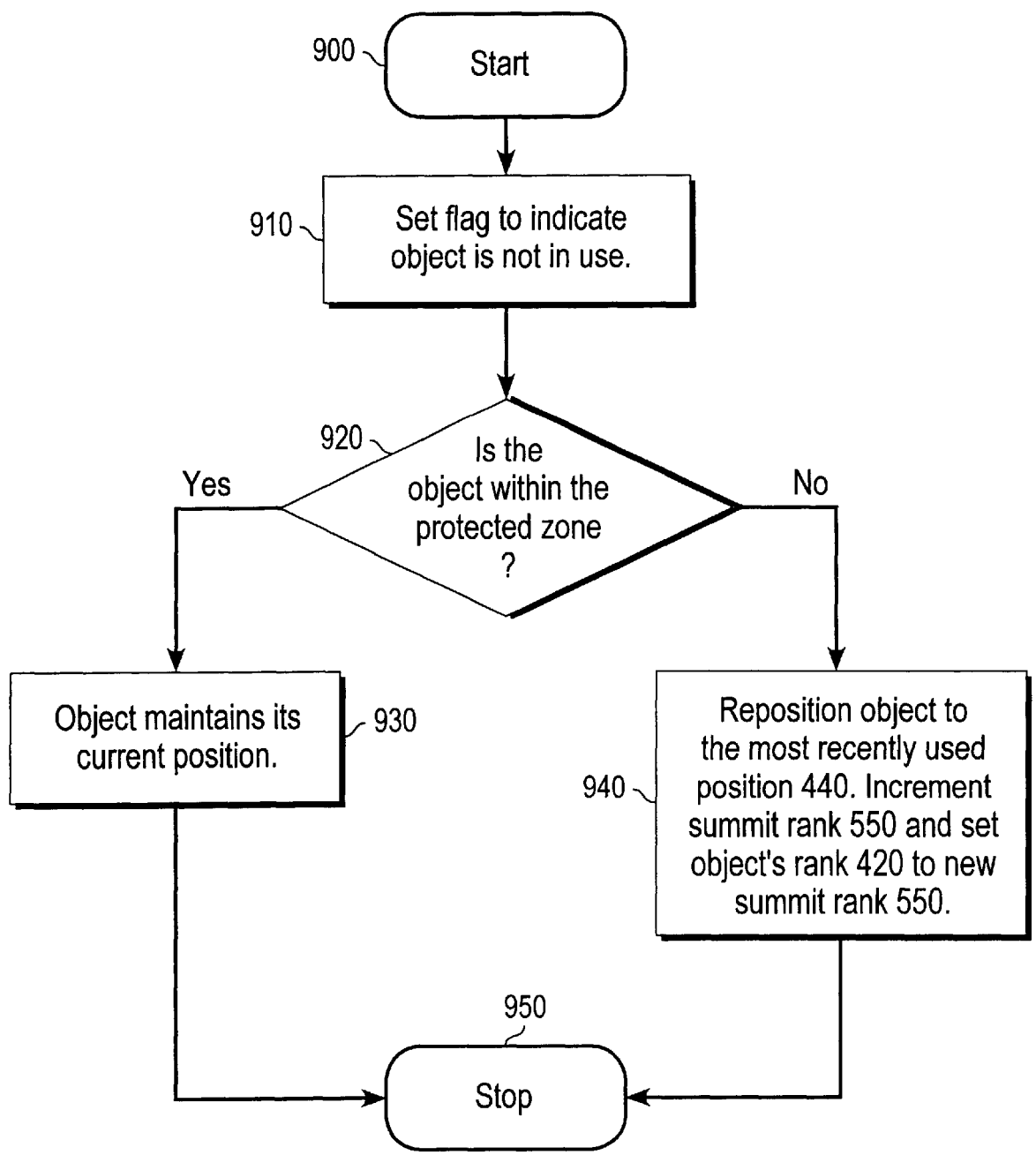
FIG. 9 is a flow diagram illustrating the operation of freeing an object according to another embodiment of the invention.

The act of freeing an object in a Type 2 embodiment will now be described with reference to FIG. 9. The object cache manager resets (910) the flag of the freed object to indicate that the object is not in use. The object cache manager then determines (920) if the freed object resides in the protected zone 420. If so, then the object cache manager maintains (930) the freed object's current position in the object cache. If not, the object cache manager repositions (940) the freed object to the most recently used position 440. The object cache manager then increments the summit rank and sets the rank of the freed object to this new value.

IV. DESTROYING AN OBJECT

Figure 10:
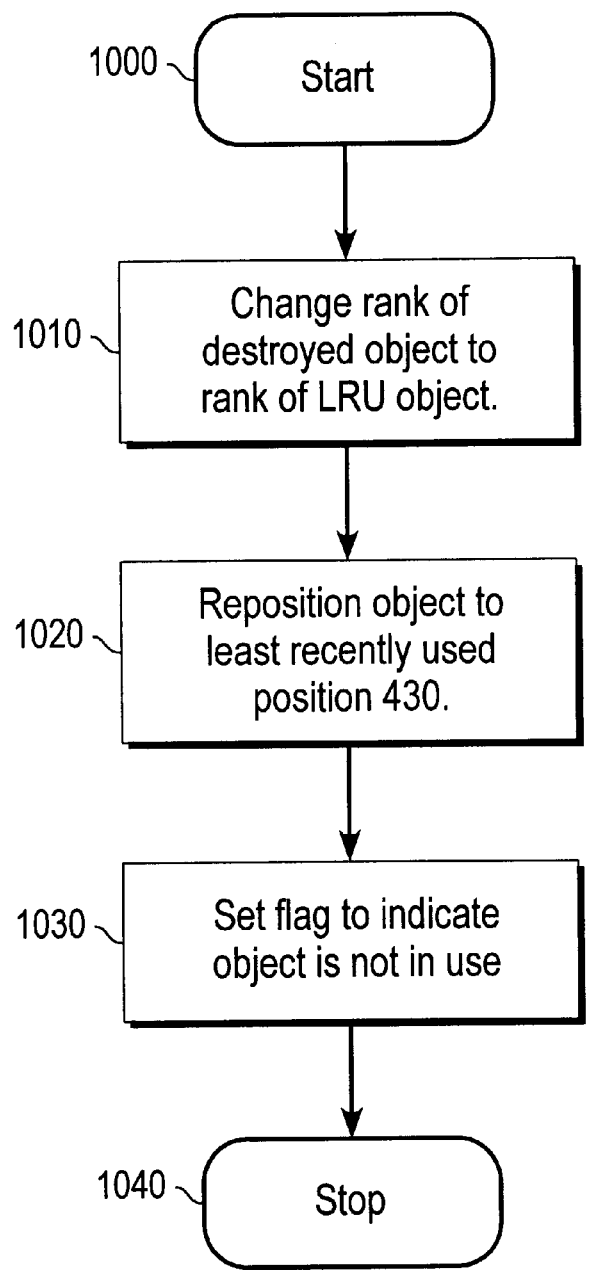
FIG. 10 is a flow diagram illustrating the operation of destroying an object according to an embodiment of the invention.

The process of destroying an object in the object cache 400 will now be explained with reference to FIG. 10. The object cache manager sets (1010) the rank of the destroyed object to the rank of the object in the least recently used position 430. The object cache manager repositions (1020) the destroyed object to the least recently used position 430. The object cache manager then resets (1040) the flag of the destroyed object to indicate that the destroyed object is not in use. The destroyed object will thus be the next object to be removed from the object cache when another object is inserted into the cache.

V. HARDWARE OVERVIEW

In one embodiment, the object cache manager of the present invention is implemented as a set of computer executable instructions. FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for generating a digital video content. According to one embodiment of the invention, a digital video content is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The execution of the sequences of instructions required to practice the invention need not be performed by a single computer system 1100. The sequences of instructions required to practice the invention may be performed by a plurality of computer systems 1100 connected to local network 1122, connected to the Internet 1128, or otherwise in data communication with each other.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit requested program code for an application program through Internet 1128, ISP 1126, local network 1122 and communication interface 1118.

Processor 1104 may execute the received code as it is received, and/or stored in storage device 1110, or other non-volatile storage for later execution. In this manner, computer system 1100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for managing an object cache, comprising:

receiving a request for an object resident in said object cache;

determining whether said object is currently within a particular portion of said object cache; and in response to a determination that said object is currently within said particular portion of said object cache, maintaining said object within said particular portion, wherein said object has a current position relative to other objects in said object cache, and wherein maintaining said object within said particular portion comprises:
   maintaining said object at said current position such that said object is not relocated.

2. The method of claim 1, wherein said particular portion is a most recently used portion comprising a plurality of recently requested objects.

3. The method of claim 2, wherein said object has a flag associated therewith, and wherein said method further comprises:

updating said flag to indicate that said object is in use.

4. The method of claim 2, wherein said object has a rank associated therewith, and wherein determining whether said object is currently within said particular portion of said object cache comprises:

determining whether said rank falls within a particular range.

5. The method of claim 4, wherein said particular range is determined based at least upon a predetermined factor, and a summit rank, where said summit rank is equal to a highest rank of any object in said object cache.

6. The method of claim 4, further comprising:

in response to a determination that said object is not currently within said particular portion of said object cache, relocating said object to place it within said particular portion.

7. The method of claim 6, wherein said particular portion has a particular position for accommodating a most recently used object, and wherein relocating said object comprises:

moving said object into said particular position;

incrementing a summit rank to derive a new summit rank, wherein said summit rank is equal to a highest rank of any object currently in said object cache; and assigning said new summit rank to said object.

8. A computer implemented method for managing an object cache, comprising:

receiving a request to free an object that was formerly in use;

determining whether said object is currently within a particular portion of said object cache; and in response to a determination that said object is currently within said particular portion of said object cache, maintaining said object within said particular portion, wherein said object has a current position relative to other objects in said object cache, and wherein maintaining said object within said particular portion comprises:
   maintaining said object at said current position such that said object is not relocated.

9. The method of claim 8, wherein said particular portion is a most recently used portion comprising a plurality of recently requested objects.

10. The method of claim 9, wherein said object has a flag associated therewith, and wherein said method further comprises:

updating said flag to indicate that said object is not in use.

11. The method of claim 9, wherein said object has a rank associated therewith, and wherein determining whether said object is currently within said particular portion of said object cache comprises:

determining whether said rank falls within a particular range.

12. The method of claim 11, wherein said particular range is determined based at least upon a predetermined factor, and a summit rank, where said summit rank is equal to a highest rank of any object in said object cache.

13. The method of claim 11, further comprising:

in response to a determination that said object is not currently within said particular portion of said object cache, relocating said object to place it within said particular portion.

14. The method of claim 13, wherein said particular portion has a particular position for accommodating a most recently used object, and wherein relocating said object comprises:

moving said object into said particular position;

incrementing a summit rank to derive a new summit rank, wherein said summit rank is equal to a highest rank of any object currently in said object cache; and assigning said new summit rank to said object.

15. A computer readable medium having stored thereon instructions which when executed by one or more processors, cause the one or more processors to manage an object cache, said computer readable medium comprising:

instructions for causing one or more processors to receive a request for an object resident in said object cache;

instructions for causing one or more processors to determine whether said object is currently within a particular portion of said object cache; and instructions for causing one or more processors to maintain, in response to a determination that said object is currently within said particular portion of said object cache, said object within said particular portion, wherein said object has a current position relative to other objects in said object cache, and wherein instructions for causing one or more processors to maintain said object within said particular portion comprises:
    instructions for causing one or more processors to maintain said object at said current position such that said object is not relocated.

16. The computer readable medium of claim 15, wherein said particular portion is a most recently used portion comprising a plurality of recently requested objects.

17. The computer readable medium of claim 16, wherein said object has a flag associated therewith, and wherein said computer readable medium further comprises:

instructions for causing one or more processors to update said flag to indicate that said object is in use.

18. The computer readable medium of claim 16, wherein said object has a rank associated therewith, and wherein instructions for causing one or more processors to determine whether said object is currently within said particular portion of said object cache comprises:

instructions for causing one or more processors to determine whether said rank falls within a particular range.

19. The computer readable medium of claim 18, wherein said particular range is determined based at least upon a predetermined factor, and a summit rank, where said summit rank is equal to a highest rank of any object in said object cache.

20. The computer readable medium of claim 18, further comprising:

instructions for causing one or more processors to relocate, in response to a determination that said object is not currently within said particular portion of said object cache, said object to place it within said particular portion.

21. The computer readable medium of claim 20, wherein said particular portion has a particular position for accommodating a most recently used object, and wherein instructions for causing one or more processors to relocate said object comprises:

instructions for causing one or more processors to move said object into said particular position;

instructions for causing one or more processors to increment a summit rank to derive a new summit rank, wherein said summit rank is equal to a highest rank of any object currently in said object cache; and instructions for causing one or more processors to assign said new summit rank to said object.

22. A computer readable medium for managing an object cache, comprising:

instructions for causing one or more processors to receive a request to free an object that was formerly in use;

instructions for causing one or more processors to determine whether said object is currently within a particular portion of said object cache; and instructions for causing one or more processors to maintain, in response to a determination that said object is currently within said particular portion of said object cache, said object within said particular portion, wherein said object has a current position relative to other objects in said object cache, and wherein instructions for causing one or more processors to maintain said object within said particular portion comprises:

instructions for causing one or more processors to maintain said object at said current position such that said object is not relocated.

23. The computer readable medium of claim 22, wherein said particular portion is a most recently used portion comprising a plurality of recently requested objects.

24. The computer readable medium of claim of 23, wherein said object has a flag associated therewith, and wherein said computer readable medium further comprises:

instructions for causing one or more processors to update said flag to indicate that said object is not in use.

25. The computer readable medium of claim 23, wherein said object has a rank associated therewith, and wherein instructions for causing one or more processors to maintain to determine whether said object is currently within said particular portion of said object cache comprises:

instructions for causing one or more processors to maintain to determine whether said rank falls within a particular range.

26. The computer readable medium of claim 23, wherein said particular range is determined based at least upon a predetermined factor, and a summit rank, where said summit rank is equal to a highest rank of any object in said object cache.

27. The computer readable medium of claim 23, further comprising:

instructions for causing one or more processors to relocate, in response to a determination that said object is not currently within said particular portion of said object cache, said object to place it within said particular portion.

28. The computer readable medium of claim 27, wherein said particular portion has a particular position for accommodating a most recently used object, and wherein instructions for causing one or more processors to relocate said object comprises:

instructions for causing one or more processors to move said object into said particular position;

instructions for causing one or more processors to increment a summit rank to derive a new summit rank, wherein said summit rank is equal to a highest rank of any object currently in said object cache; and instructions for causing one or more processors to assign said new summit rank to said object.

29. An apparatus for managing an object cache, comprising:

a mechanism for receiving a request for an object resident in said object cache;

a mechanism for determining whether said object is currently within a particular portion of said object cache; and a mechanism for maintaining, in response to a determination that said object is currently within said particular portion of said object cache, said object within said particular portion, wherein said object has a current position relative to other objects in said object cache, and wherein mechanism for maintaining said object within said particular portion comprises:

a mechanism for maintaining said object at said current position such that said object is not relocated.

30. The apparatus of claim 29, wherein said particular portion is a most recently used portion comprising a plurality of recently requested objects.

31. The apparatus of claim 30, wherein said object has a flag associated therewith, and wherein said apparatus further comprises:

a mechanism for updating said flag to indicate that said object is in use.

32. The apparatus of claim 30, wherein said object has a rank associated therewith, and wherein said mechanism for determining whether said object is currently within said particular portion of said object cache comprises:

a mechanism for determining whether said rank falls within a particular range.

33. The apparatus of claim 32, wherein said particular range is determined based at least upon a predetermined factor, and a summit rank, where said summit rank is equal to a highest rank of any object in said object cache.

34. The apparatus of claim 32, further comprising:

a mechanism for relocating, in response to a determination that said object is not currently within said particular portion of said object cache, said object to place it within said particular portion.

35. The apparatus of claim 34, wherein said particular portion has a particular position for accommodating a most recently used object, and wherein said mechanism for relocating said object comprises:

a mechanism for moving said object into said particular position;

a mechanism for incrementing a summit rank to derive a new summit rank, wherein said summit rank is equal to a highest rank of any object currently in said object cache; and a mechanism for assigning said new summit rank to said object.

36. An apparatus for managing an object cache, comprising:

a mechanism for receiving a request to free an object that was formerly in use;

a mechanism for determining whether said object is currently within a particular portion of said object cache; and a mechanism for maintaining, in response to a determination that said object is currently within said particular portion of said object cache, said object within said particular portion, wherein said object has a current position relative to other objects in said object cache, and wherein said mechanism for maintaining said object within said particular portion comprises:

a mechanism for maintaining said object at said current position such that said object is not relocated.

37. The apparatus of claim 36, wherein said particular portion is a most recently used portion comprising a plurality of recently requested objects.

38. The apparatus of claim of 37, wherein said object has a flag associated therewith, and wherein said apparatus further comprises:

a mechanism for updating said flag to indicate that said object is not in use.

39. The apparatus of claim 37, wherein said object has a rank associated therewith, and wherein said mechanism for determining whether said object is currently within said particular portion of said object cache comprises:

a mechanism for determining whether said rank falls within a particular range.

40. The apparatus of claim 39, wherein said particular range is determined based at least upon a predetermined factor, and a summit rank, where said summit rank is equal to a highest rank of any object in said object cache.

41. The apparatus of claim 39, further comprising:

a mechanism for relocating, in response to a determination that said object is not currently within said particular portion of said object cache, said object to place it within said particular portion.

42. The apparatus of claim 41, wherein said particular portion has a particular position for accommodating a most recently used object, and wherein said mechanism for relocating said object comprises:

a mechanism for moving said object into said particular position;

a mechanism for incrementing a summit rank to derive a new summit rank, wherein said summit rank is equal to a highest rank of any object currently in said object cache; and a mechanism for assigning said new summit rank to said object.

43. The method of claim 3, further comprising:

accessing said object without removing said object from said object cache.

44. The method of claim 43, further comprising:

receiving a request to free said object; and in response to said request to free said object, resetting said flag, thereby indicating that said object is available again in said object cache without needing to re-insert said object into said object cache.

45. The computer readable medium of claim 19, wherein said computer readable medium further comprises:

instructions for causing one or more processors to access said object without removing said object from said object cache.

46. The computer readable medium of claim 45, wherein said computer readable medium further comprises:

instructions for causing one or more processors to receive a request to free said object; and instructions for causing one or more processors to reset said flag in response to said request to free said object, thereby indicating that said object is available again in said object cache without needing to re-insert said object into said object cache.

47. The apparatus of claim 31, further comprising:

a mechanism for accessing said object without removing said object from said object cache.

48. The apparatus of claim 47, further comprising:

a mechanism for receiving a request to free said object; and a mechanism for resetting said flag in response to said request to free said object, thereby indicating that said object is available again in said object cache without needing to re-insert said object into said object cache.

* * * * *